April 4, 1950
J. M. L. JANSSEN
2,502,955
APPARATUS FOR DERIVING FROM A RECURRENT WAVE,
A VOLTAGE OF RELATIVELY LOW FUNDAMENTAL
FREQUENCY BUT OF THE SAME SHAPE
Filed March 5, 1948
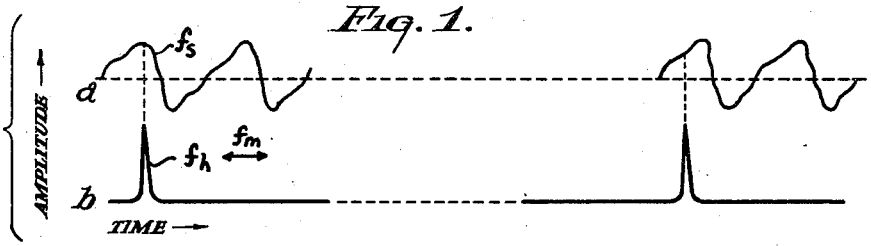
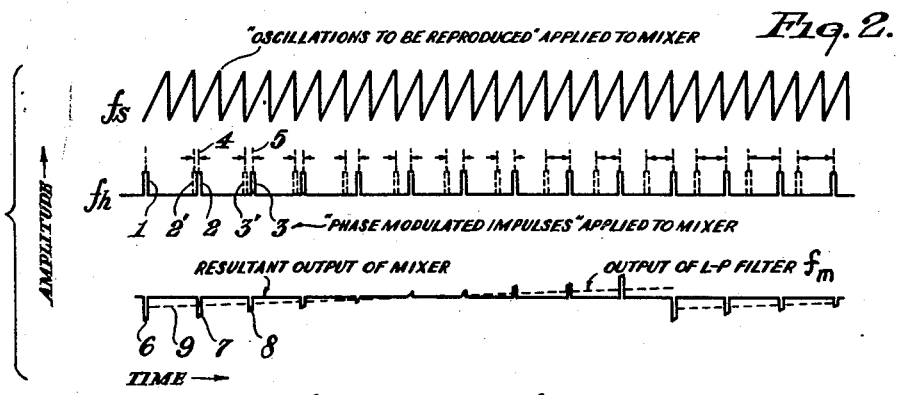
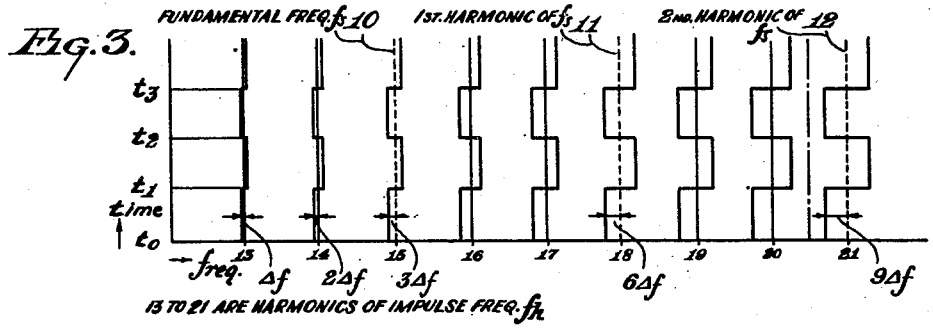
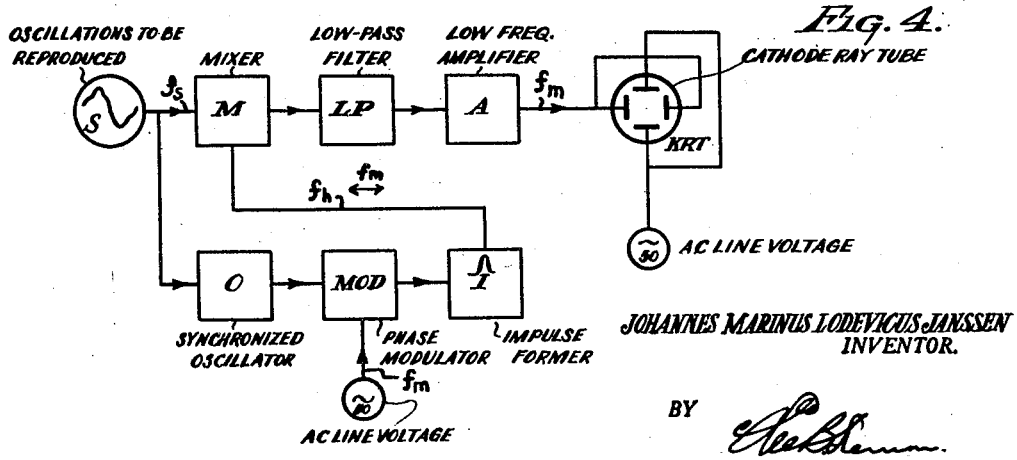
JOHANNES MARINUS LODEVICUS JANSSEN
INVENTOR.
BY
ATTORNEY.

Patented Apr. 4, 1950

2,502,955

UNITED STATES PATENT OFFICE 2,502,955

APPARATUS FOR DERIVING FROM A RECURRENT WAVE, A VOLTAGE OF RELATIVELY LOW FUNDAMENTAL FREQUENCY BUT OF THE SAME SHAPE

Johannes Marinus Lodevicus Janssen, Eindhoven, Netherlands, assignor to Hartford National Bank and Trust Company, Hartford, Conn., as trustee Application March 5, 1948, Serial No. 13,246
In the Netherlands March 25, 1947

9 Claims. (Cl. 171—95)

1

The invention relates to a circuit-arrangement for deriving from a periodically variable, electrical signal voltage a likewise periodically variable, electrical measuring voltage of lower fundamental frequency, to an oscillograph for displaying the form of the derived voltage and a method in which use is made of this circuit-arrangement.

As is well-known, a periodically variable, electrical signal voltage may be characterized by the amplitude of its Fourier components, briefly referred to hereinafter as harmonics. The more accurately the curve shape of the signal voltage is to be ascertained, the greater is the number of harmonics to be considered. In measuring, recording, studying or examining a periodically variable signal voltage having a fundamental frequency $f_s$ difficulties will arise as soon as the product of the fundamental frequency $f_s$ and the ordinal number N of the highest harmonic component one wants to consider exceeds a definite value, since if $f_s.N$ is higher than about $10^7$ c/s, the devices to be used for examination, such as oscillographs, frequency analysers, amplitude- and phase-measuring devices, exhibit a troublesome inertia and a comparatively great attenuation for the high harmonics. Hence the harmonics are not accurately measured, reproduced or studied either with respect to their amplitude or with respect to their phase and it is finally impossible to ascertain, to study or to reproduce the curve shape of the signal with a definite accuracy. Still greater difficulties arise if the amplitude of the signals to be reproduced or examined is too small to enable the reproduction or examination without amplification, since it is impossible to amplify signals of such a high frequency. However, this is nevertheless required in this case, since otherwise the curve-shape of the signal would inevitably be influenced by the amplifier in an undesirable manner.

The invention has for its object to obviate these disadvantages, at least partly.

The invention is based on the recognition that if the phenomenon to be examined or reproduced could be divided in frequency while maintaining the curve-shape, both the fundamental frequency and the frequencies of the harmonics would drop by a factor. In consequence thereof it would be possible to reduce the frequency of the highest harmonic $f_s.N$ to such an extent that in measur-

2 ing or examining the phenomenon use may be made of the devices usually employed for this purpose, such as oscillographs, frequency-analysers, amplitude- and phase-measuring devices without harmful distortions or errors being thus brought about.

For this purpose the invention provides a circuit arrangement for deriving from a periodically variable, electrical signal voltage having a fundamental frequency $f_s$ a likewise periodically variable, electrical measuring voltage of lower fundamental frequency $f_m$.

The circuit-arrangement according to the invention is characterized in that the signal voltage is supplied to a mixing stage and is mixed therein with an auxiliary voltage consisting of phase-modulated impulses having a modulation frequency $f_m$ and a central frequency $f_h$ which is equal to the quotient of the signal frequency $f_s$ and an integer $n$ and not lower than 2 $f_m$, whereupon the mixture thus obtained is fed to a low-pass filter which has a limit frequency lying between ½ $f_h$ and $f_m$ and from which the measuring voltage is taken.

That Fourier component of the measuring voltage thus obtained which has the highest ordinal number has a frequency which is lower than that of the Fourier component of the same ordinal number which occurs in the signal voltage. Thus, with the use of the conventional devices for measuring, recording, reproducing and studying alternating voltages, the errors and distortions occurring therein by reason of the high frequency components of the signal voltage are avoided or at least reduced. It has furthermore proved to be always possible, as will be shown hereinafter, to derive the curve-shape of the signal voltage from that of the measuring voltage.

This is effected in a very simple manner if in a preferred form of the circuit-arrangement according to the invention the phase-shift of the phase-modulated impulses varies at intervals linearly with time. As will also be set out more fully hereinafter, the measuring voltage then exhibits by intervals the same curve shape as the signal voltage. In this case the signal frequency may consequently be studied, measured, recorded or reproduced by supplying the measuring voltage to the apparatus suitable for these operations. For example, the measuring voltage is supplied to a conventional oscillograph, which would reproduce the signal voltage if applied directly with great distortion only, but which, owing to the so much lower frequency of the measuring voltage reproduces the curve-shape thereof and hence of the signal voltage without any distortion.

However, a phase-shift varying linearly with time is not necessary to obtain a faithful oscillogram of the signal voltage. When using the circuit-arrangement according to the invention it is possible to obtain with an oscillograph a faithful image of the curve-shape of the signal voltage by supplying the measuring voltage, according to a further feature of the invention, to the system which brings about deflection of the image point in one direction, whereas the deflection of the image point in another direction is, at least at intervals, proportional to the instantaneous value of the phase-shift of the phase-modulated impulse.

The invention will now be explained with reference to the accompanying drawing, wherein Figs. 1, 2 and 3 diagrammatically illustrate the basic idea of the invention and Fig. 4 represents a block diagram of the circuit-arrangement according to the invention.

Fig. 1a shows a few cycles of high-frequency oscillations required to be reproduced or examined, which oscillations have a fundamental frequency $f_s$, while Fig. 1b represents two successive phase-modulated impulses, which have a modulation frequency $f_m$ and a central frequency $f_h$ and with which the high-frequency oscillation is to be mixed. In this case $n.f_h = f_s$, in which $n$ is an integer. This relation is preferably realized by having the generator furnishing the impulses $b$, synchronized by the oscillation $a$ in any manner known for this purpose. In this case one impulse occurs in every $n$ cycles of $f_s$. Moreover, this generator is phase-modulated with a low frequency $f_m$, so that successive impulses $b$ coincide, as to time, with different ordinate values of the oscillation $a$. Together with the signal voltage $f_s$, the impulses are now supplied to a mixing tube, for example by causing these impulses to act upon the control-grid and by causing the signal voltage to function as the anode voltage of this tube. The circuit-arrangement is such that the output voltage of the mixing tube is always zero, except at the moment when an impulse occurs, the output voltage of the mixing tube being during the duration of the impulse proportional to the instantaneous value of the signal voltage. Since the impulses are of relatively narrow width, we are concerned in each impulse with a mean ordinate value of the signal voltage. Beyond the mixing tube we obtain a sequence of impulses which are amplitude-modulated in accordance with the variation of the oscillation $a$ and which are phase-modulated with the frequency $f_m$. By means of a low-pass filter the latter frequency may be filtered out as a fundamental frequency with a preferably large number of harmonics.

The measuring voltage thus obtained is now representative of the signal voltage. The relation existing between these two depends on the manner in which the phase of the impulses varies with time. If this occurs linearly at intervals, i. e. according to a so-called saw-tooth or triangular function, the impulses travel intermittently at a uniform speed along the curve $f_s$, so that the points of this signal which produce impulses beyond the mixing tube are equidistant measured in time. Consequently, the measuring voltage, which may be regarded as produced by smoothing these impulses to a fluent curve due to the effect of the low-pass filter, successively assumes at equal time intervals values which correspond to values of the signal voltage which are equidistant in time. The measuring voltage thus affords a faithful image of the signal voltage.

This distinctly appears from Fig. 2. For the sake of simplicity, a saw-tooth shaped signal voltage $f_s$ has been chosen in this instance. The auxiliary voltage $f_h$ consists of impulses 1, 2, 3, etc. which are phase-modulated and therefore shifted in time with respect to the unmodulated impulses 2', 3', etc. (shown in dotted lines). This pase-modulation is effected here in such manner that the phase-angle increases, at intervals, linearly with time, i. e. the distances 4, 5, etc. between the impulses represented by dotted and full lines increase in a certain interval in direct proportion to time, this interval now forming part of the variation cycle of the phase angle, Fig. 2 only shows the cycle interval referred to above. By mixing the impulse-shaped auxiliary voltage with the signal voltage $f_s$ impulses 6, 7, 8, etc. are produced, which are amplitude-modulated and which represent successive instantaneous values of $f_s$. The low-pass filter to which the impulses are supplied smoothes them until the measuring signal 9 shown by dotted line is left. This is shown in Figure 2, as far as the amplitude is concerned, in an exaggerated manner. It is evident, however, that $f_m$ exhibits the same curve-shape, in the present case the same sawtooth-shape, as $f_s$. It should furthermore be noted that the lowest fundamental frequency occurring in the measuring signal is equal to the frequency with which the phase of the impulses $f_h$ is varied, since after the phase-angle has varied linearly with time during a certain interval, the cycle of this phase-variation will be completed, for example, by an oppositely linear variation with time, and will then start again, as a result of which the above-described reproduction of $f_m$ by $f_s$ re-commences. It is, of course, possible, though not advantageous, to take the sweep of the phase-modulation (as in Fig. 2) such that in one period of the phase-modulation frequency $f_m$ more than one period of the signal frequency $f_s$ is "scanned" by the impulses and reproduced in the measuring signal.

Fig. 3 illustrates in another manner the operation of the circuit-arrangement according to the invention, for in this figure the different frequencies occurring are plotted as functions of time. The frequencies are plotted horizontally, the time vertically. Reference numerals 10, 11 and 12 designate the fundamental frequency $f_s$, the first and the second harmonics of the signal voltage respectively. The figure shows the harmonics 13 to 21 of the unmodulated, impulse-shaped auxiliary voltage having a fundamental frequency $f_h$, which voltage, as is well-known, exhibits more harmonics with mutually equal amplitudes as the impulse is narrower. Since here $f_h$ has been so chosen that $f_h = \frac{1}{3} f_s$, the harmonics 15, 18 and 21 of the auxiliary voltage coincide with the fundamental frequency 10 and the harmonics 11 and 12 of the signal voltage respectively. Now the impulses are modulated in phase, which, in this form of construction, given by way of example, is effected in such manner that in successive equal time intervals the phase-shift increases and decreases proportionally to time. Consequently, from $t_0$ to $t_1$ the phase-shift decreases uniformly with time, from $t_1$ to $t_2$ it regularly increases, and so on. Consequently the impulses "scan" the signal voltage, as is shown in and has been described with reference to Fig. 2. Owing to the phase-shift varying linearly with time, the instantaneous impulse frequency differs by a constant value ($\Delta f_h$) from $f_h$. Thus from $t_0$ to $t_1$ the instantaneous fundamental frequency of the impulses is equal to $f_h - \Delta f_h$, from $t_1$ to $t_2$ equal to $f_h + \Delta f_h$, and so on. However, the harmonics of the auxiliary voltage are also shifted, viz. over distances $N \cdot f_h$, in which N is the ordinal number of the harmonics involved. The displacement of the harmonics 15, 18 and 21 is $3\Delta f_h$, $6\Delta f_h$ and $9\Delta f_h$ respectively. The mixing of the impulses in the mixing stage may also be considered as giving rise to the production of so-called difference frequencies, i. e. voltages having frequencies which are equal to the differences between the frequencies of the harmonics of the signal voltage and the immediately adjacent harmonics of the impulses. For the fundamental frequency and the first and second harmonics of the signal voltage these difference frequencies are $3\Delta f_h$, $6\Delta f_h$ and $9\Delta f_h$ respectively; they are, consequently, again in harmonic relation with one another. Moreover, the amplitudes of these voltages are proportional to the amplitudes of the fundamental frequency and the first and second harmonics of the signal voltage, since the amplitudes of the harmonics of the impulse frequency are all equal. The voltages referred to consequently represent the fundamental frequency and the harmonics of the signal voltage. Of course, many other difference frequencies are formed between the other frequencies shown in Figure 3. However, if care is taken to ensure that the difference frequency formed by the highest harmonic of the signal voltage which is to be considered and the next harmonic of the auxiliary voltage is less than ½ $f_h$, the frequencies of the other desired difference-voltage are certainly still lower than those of the undesired difference-voltages (for example produced by mixing the harmonics 18, 19 and 20 with the second harmonic 12 of the signal voltage). The undesired difference-frequencies may then be separated from the desired difference-frequencies by means of a low-pass filter which only allows the latter to pass. For this purpose the filter must have a limit-frequency which is, at the most, equal to ½ $f_h$. As will be seen hereinafter this indication still requires slight correction. The closer to ½ $f_h$ the limit-frequency, the more harmonics of the measuring voltage will still be allowed to pass, and hence the more faithfully the signal voltage can be reproduced by the measuring voltage. In order to ensure that there is still fidelity of reproduction (to be considered here as correspondence in shape), this limit-frequency must certainly exceed $f_m$. If so, at least the fundamental frequency is always allowed to pass and amplitude- and phase-variations occurring in the signal voltage, and hence also in the measuring voltage, may still be studied.

The maximum value of the limit-frequency of the filter may be exactly defined as follows. The cycle of the phase-modulation lasts from $t_0$ to $t_2$; its frequency $f_m$, and hence also the fundamental frequency $f_m$ of the measuring voltage is consequently equal to $$\frac{1}{t_2 - t_0}$$

The difference frequency $\Delta f_h$ may also be considered as being produced by a frequency-modulation the frequency sweep of which is equal to $\Delta$ $f_h$. The index of this frequency-modulation, defined as the quotient of frequency-sweep and instantaneous frequency, is consequently equal to $$\frac{\Delta f_h}{f_m}$$

and for the N-th harmonic to $$\frac{N \Delta f_h}{f_m}$$

Together with the nature of the modulation cycle this modulation index $m$ determines the shape of the Fourier spectrum of the phase- or frequency-modulated oscillations under consideration. Thus the frequency-spectrum of the N-th harmonic of the phase-modulated impulse is characterized by the corresponding modulation index together with the nature of the modulation cycle. The spectra of the successive harmonics are now required not to overlap one another, for it has been found that in that case undue difference-frequencies would be produced. It has now been found that with the circuit-arrangement according to the invention high values of N often occur. For these values the width of the Fourier spectrum is, depending on the nature of the modulation cycle, a low percentage larger than the frequency band covered by the instantaneous frequency. Thus, for example, we find in the case of sinusoidal phase-modulation and of a modulation-index $m = 100$ that 99.99% of the energy is included in the first 108 sidebands, i. e. the width of the spectrum only exceeds by 8% the bandwidth covered by the instantaneous frequency.

In one form of construction of a cathode-ray oscillograph for high frequencies, in which the circuit-arrangement according to the invention was used, $f_h$ amounted to 100 kcs. and $f_m$ to 50 kcs. The phase-modulation was sinusoidal and the limit-frequency of the filter was 40 kcs. However, in connection with the phase-characteristic curve (only a simple filter being used) only the part up to 20 kcs. of the pass-range could be used. The amplitude of the phase-modulation was 1 radian. The instantaneous impulse-frequency consequently fluctuated according to a sine-function with a period of 50 cs. about its mean value. The phase may be represented by $\Psi = \omega t + \varphi \cos pt$. and the frequency therefore by $$\frac{d\psi}{dt} \omega - \varphi p \sin pt.$$

The frequency-sweep was consequently 50 cs. If N is the ordinal number of the highest harmonic still to be reproduced, its frequency-sweep is $N \times 50$ cs. The instantaneous frequency covers in this case a range of $N \times 50$ cs. on either side of the central frequency $N \times f_h$. It may be safely assumed that the bandwidth of the Fourier spectrum does not exceed, in this case, 1.5× this value, i. e. $1.5 \times N \times 50$ cs. on either side of the central frequency. The highest difference-frequency which may be formed between a component of this spectrum and that harmonic of the signal voltage which corresponds to the central frequency thereof must now still be passed by the low-pass filter, from which follows that $$1.5 \times 50 \times N < 20{,}000$$

It follows therefrom that N is approximately equal to 270, that is to say that harmonics of the signal voltage which have frequencies lower than the 270th harmonic of the auxiliary voltage and consequently lower than 27 mcs. are still reproduced without distortion.

In this case the phase-shift did not vary linearly with time, but sinusoidally. However, a faithful image of the signal voltage may, nevertheless, be obtained on the screen of the oscillograph by choosing the time-base voltage so as to be proportional to the (in this case, sinusoidal) phase-modulation voltage. In Fig. 2 successive impulses then no longer coincide with points of the signal voltage curve which are equidistant with respect to time, but with points at unequal distances with respect to time. Where the velocity of the impulses is highest, the distances are greatest, but in this case also the velocity of the image point on the screen in the direction of the time-axis is highest if for the time-base voltage a voltage is used which is proportional to the instantaneous value of the phase-shift, a faithful image being thus nevertheless produced.

In the numerical example given above part of one period of the signal voltage of 100 kcs. will appear on the screen in a size of 2 radians or $$\frac{1}{\pi}$$

period. For a signal voltage having a frequency of 1 mcs. or 10 mcs. this would be $$\frac{10}{\pi}$$

or 3.14 odd and $$\frac{100}{\pi}$$

or 31.4 odd periods respectively. Thus, from the number of periods $k$ appearing on the screen and the phase-sweep $\Psi$ in radians of the impulses the fundamental frequency $f_s$ of the signal voltage may be expressed in the generally known central impulse frequency (fundamental frequency of the auxiliary voltage), i. e. in general we have $$f_s = f_h \frac{\pi k}{\varphi}$$

The highest frequency $f_{gr}$ that a harmonic of $f_s$ may have to permit its being faithfully restored in $f_m$ is determined by the finite width of the impulses, since for harmonics of the impulses the period of which is of the order of magnitude of the impulse width this finite width brings about a decrease in amplitude. Hence, also higher harmonics of the signal voltage will be reproduced with reduced amplitudes.

The optimum value for the frequency of the auxiliary voltage (impulse frequency) $f_h$, for given $f_{gr}$ and $f_m$, is represented by $f_h^2 \approx 2\pi f_m \times f_{gr}$ and sometimes slightly differs from this value, depending on the phase-modulating voltage used.

Fig. 4 shows a block-diagram of an oscillograph, in which use is made of the circuit-arrangement according to the invention.

The oscillations to be reproduced, which originate from source S, are supplied partly to a mixing tube M and partly to an oscillator O, which is synchronized by them according to any of the methods known for this purpose. The synchronized oscillations are modulated in phase by the alternating-current power line voltage in a modulator Mod and then supplied to the aforesaid mixing tube M through a device I which converts the modulated oscillations into impulses. The resultant mixture is fed through a low-pass filter LP and through a low-frequency amplifier A to one set of deflection members of a cathode-ray tube KRT, the other set of deflection members of which is connected to the alternating-current power line whose voltage acts as a time-base.

A comparatively slight modification of this device makes it possible simultaneously to reproduce two or more high-frequency oscillations in a simple manner, it being only necessary in this case to have a separate channel constituted by the devices M-LP-A available for each high-frequency oscillation, to lead each of these oscillations through one of these channels and to provide for a sufficiently rapid change-over from the terminal points of these channels to the cathode-ray tube. The latter operation may be effected by means of an electronic switch of any known type. However, if two high-frequency oscillations are required to be reproduced, it is simpler to supply them to the same mixing tube through two channels which are alternately blocked by an alternating voltage which differs by 90° in phase from the modulation voltage. The change-over always takes place in this case at the terminal points of the time-base at the moments of the lowest recording speed, so that the changing-over time need not be particularly short. The channels through which the two high-frequency voltages are supplied to the common mixing tube may consist, for example, of one or more amplifying- or attenuating-stages.

The measuring voltage obtained with the aid of the circuit-arrangement may be used, as said before, to study, analyse, check, reproduce or examine the signal voltage. It is, of course, by no means necessary to use a cathode-ray oscillograph for this purpose. The reproduction may also be effected, for example, by a loop galvanometer type oscillograph, or the measuring voltage may be fed to a frequency-analyser, or to a device for measuring amplitude, phase or distortion. Taking into account the cycle used for the phase-modulation, it is now possible to gather information about the signal voltage from this examination of $f_m$.

What I claim is:

1. Apparatus for deriving from a periodically variable signal voltage, having a fundamental frequency $f_s$ and given wave form, a measuring voltage having a relatively low fundamental frequency $f_m$ but the same wave form, said apparatus comprising means to generate periodic voltage impulses having a central frequency $f_h$, means to phase modulate said impulses at a modulation frequency $f_m$, the central frequency $f_h$ being equal to the quotient of the signal frequency $f_s$ and an integer $n$, and means to combine said phase-modulated impulses with said signal voltage to produce said measuring voltage.

2. An arrangement, as set forth in claim 1, wherein said central frequency is not lower than $2.f_m$.

3. Apparatus for deriving from a periodically variable signal voltage, having a fundamental frequency $f_s$ and a given wave form, a measuring voltage having a relatively low fundamental frequency $f_m$ but the same wave form, said apparatus comprising means to generate periodic voltage impulses having a central frequency $f_h$, means to phase modulate said impulses at a modulation frequency $f_m$, the central frequency $f_h$ being equal to the quotient of the signal frequency $f_s$ and an integer $n$, the central frequency being not lower than $2.f_m$, a mixing circuit, means to apply said phase-modulated pulses and said signal voltage to said mixing circuit to produce output pulses whose amplitude varies in accordance with the instantaneous amplitude of said signal voltage, and filter means coupled to the output of said mixing circuit to yield a measuring voltage having a wave shape corresponding to the wave shape of said signal voltage.

4. Apparatus for deriving from a periodically variable signal voltage, having a fundamental frequency $f_s$ and a given wave form, a measuring voltage having a relatively low fundamental frequency $f_m$ but the same wave form, said apparatus comprising means to generate periodic voltage impulses having a central frequency $f_h$, means to phase-modulate said impulses at a modulation frequency $f_m$, the central frequency $f_h$ being equal to the quotient of the signal frequency $f_s$ and an integer $n$, the central frequency being not lower than $2.f_m$, a mixing circuit, means to apply said phase-modulated impulses and said signal voltage to said mixing circuit to produce output pulses whose amplitude varies in accordance with the instantaneous amplitude of said signal voltage, and filter means coupled to the output of said mixing circuit to yield a measuring voltage having a wave shape corresponding to the wave shape of said signal voltage.

5. An arrangement, as set forth in claim 4, wherein the phase shift of the phase-modulated impulses varies at intervals linearly with time.

6. A circuit arrangement for deriving from a periodically variable signal voltage, having a fundamental frequency $f_s$ and a given wave form, a measuring voltage having a relatively low fundamental frequency $f_m$ but the same wave form, and for exhibiting said measuring voltage, said circuit arrangement comprising means to generate periodic voltage impulses having a central frequency $f_h$, means to phase modulate said impulses at a modulation frequency $f_m$, the central frequency $f_h$ being equal to the quotient of the signal frequency $f_s$ and an integer $n$, the central frequency being not lower than $2.f_m$, a mixing circuit, means to apply said phase-modulated impulses and said signal voltage to said mixing circuit to produce output pulses whose amplitude varies in accordance with the instantaneous amplitude of said signal voltage, a low-pass filter network coupled to the output of said mixing circuit and yielding a measuring voltage having a wave shape corresponding to the wave shape of said signal voltage, an oscillograph having first and second deflection means, means to apply said measuring voltage to one of said deflection means, and means to apply a time base voltage to the second of said deflection means, the frequency of said time base voltage corresponding to the frequency of said modulation frequency $f_m$.

7. An arrangement, as set forth in claim 5, adapted to simultaneously reproduce two signal voltages further including means to apply said two signal voltages through separate channels to said mixing circuit, and means alternately to block said two channels with an alternating voltage having a phase difference of 90° with respect to said modulation frequency.

8. A method of driving from a periodically variable signal voltage a measuring voltage of relatively low frequency but of the same wave form comprising the steps of generating periodic voltage impulses, phase-modulating said impulses at a rate corresponding to the desired frequency of said measuring voltage, combining said signal voltage with said phase-modulated impulses to produce pulses amplitude-modulated in accordance with the instantaneous amplitude of said signal voltage, and filtering said amplitude modulating pulses to yield said measuring voltage.

9. The method of deriving from a periodically variable signal voltage, having a fundamental frequency $f_s$ and a given wave form, a measuring voltage having a relatively low fundamental frequency $f_m$ but the same wave form comprising the steps of generating periodic voltage impulses having a central frequency $f_h$, phase-modulating said impulses at a modulation frequency $f_m$, the central frequency $f_h$ being equal to the quotient of the signal frequency $f_s$ and an integer $n$, mixing the phase-modulated impulses with said signal voltage to produce pulses whose amplitude depends on the instantaneous amplitude of said signal voltage, and filtering said amplitude-modulated pulses to yield said measuring voltage.

JOHANNES MARINUS
LODEVICUS JANSSEN.

REFERENCES CITED

The following references are of record in the file of this patent:

UNITED STATES PATENTS

| Number | Name | Date |
| --- | --- | --- |
| 1,841,142 | Mathes | Jan. 12, 1932 |
| 1,907,109 | Hinton | May 2, 1933 |